United States Patent [19]
Konda et al.

[11] Patent Number: 5,751,881
[45] Date of Patent: May 12, 1998

[54] OPTICAL FIBER CABLE

[75] Inventors: Eiji Konda; Nobuhisa Ishii, both of Chiba; Ryuichi Matsuoka, Ichihara, all of Japan

[73] Assignee: Furukawa Electric Co., Ltd., Tokyo, Japan

[21] Appl. No.: 776,429

[22] PCT Filed: Jun. 7, 1996

[86] PCT No.: PCT/JP96/01548

§ 371 Date: Jan. 27, 1997

§ 102(e) Date: Jan. 27, 1997

[87] PCT Pub. No.: WO96/42029

PCT Pub. Date: Dec. 27, 1996

[30] Foreign Application Priority Data

Jun. 8, 1995 [JP] Japan ................. 7-142011

[51] Int. Cl.$^6$ ........................ G02B 6/44
[52] U.S. Cl. .................. 385/110; 385/103; 385/104; 385/105; 385/111; 385/113; 385/114
[58] Field of Search ................. 385/100–114

[56] References Cited

U.S. PATENT DOCUMENTS

| | | | |
|---|---|---|---|
| 5,193,134 | 3/1993 | Pizzorno et al. | 385/105 |
| 5,561,730 | 10/1996 | Lochkovic et al. | 385/114 |
| 5,638,478 | 6/1997 | Iwakura et al. | 385/111 |
| 5,661,836 | 8/1997 | Sano et al. | 385/111 |

FOREIGN PATENT DOCUMENTS

| | | |
|---|---|---|
| 7-333476 | 12/1995 | Japan . |
| 8-146263 | 6/1996 | Japan . |

OTHER PUBLICATIONS

Microfilm of the specification and drawings annexed to the written application of Japanese Utility Model Application No. 171969/1987 (Laid–Open No. 103814/1989) (Sumitomo Electric Industries, Ltd.) Jul. 13, 1989.

*Primary Examiner*—John Ngo
*Attorney, Agent, or Firm*—Frishauf, Holtz, Goodman, Langer & Chick

[57] ABSTRACT

An optical fiber cable comprises a slender base body having spiral grooves formed on the outer circumferential surface, and at least one optical fiber tape housed within each of said grooves, said tape including a plurality of insulated optical fibers and a resin coating layer covering said optical fibers. The base body is formed of a mixture of at least two materials differing from each other in the molecular weight distribution. The particular construction permits markedly suppressing an increase of transmission loss derived from micro-bend occurring in the optical fiber tape arranged within the base body, and also permits arranging optical fiber tapes within the base body at a higher density.

10 Claims, 2 Drawing Sheets

OPTICAL FIBER CABLE

TECHNICAL FIELD

The present invention relates to a slot-type optical fiber cable comprising a thin and long base body having spiral grooves formed on the outer circumferential surface and a plurality of optical fiber tapes stacked one upon the other within each of the spiral grooves, a plurality of optical fibers being formed within each of the optical fiber tapes, particularly, to an optical fiber cable of a small diameter having optical fibers arranged at a very high density.

BACKGROUND ART

A slot-type optical fiber cable having a plurality of optical fiber tapes stacked one upon the other within spiral grooves formed on the outer circumferential surface of a thin and long base body permits dealing with a relatively large amount of information and, thus, is used nowadays as a relay cable or a subscriber cable for public communication. In recent years, a multi-media system of information is on a sharp increase. Also, diversification of information and increase of the information amount are expected to accompany the spread of the multi-media system. Naturally, the optical fiber cable to be developed is required to be capable of coping with a greater amount of information than in the past.

Further, with increase in the amount of information, the subscriber cable or an optical fiber cable connected between a relay and an individual household is also required to be capable of coping with a greater amount of information. Under the circumstances, the slot-type optical fiber cable is also expected to be used as such an optical fiber.

To be more specific, the slot-type optical fiber cable comprises a long base body having a tension member arranged along the axis thereof and a plurality of optical fiber tapes stacked one upon the other within each of spiral grooves formed along the outer circumferential surface of the base body. For example, four optical fiber tapes are stacked one upon the other within each spiral groove. The outer surface of the base body having the optical fiber tapes arranged within the spiral grooves is wound with a holding tape. Further, a sheath is arranged to cover the outer circumferential surface of the resultant structure. In general, the base body is formed of a high density polyethylene in view of the workability, mechanical properties and cost.

The simplest means to permit the optical fiber cable to be capable of coping with an increased amount of information is to increase the number of optical fibers, or the number of optical fiber tapes, mounted within the optical fiber cable. Naturally, an increase in the number of optical fiber tapes mounted within the optical fiber cable results in an increased outer diameter of the cable. An increase in the outer diameter of the cable gives rise to difficulties. For example, the cable is unlikely to be bent, with the result that, in arranging the cable within a cable passageway, the cable fails to be arranged within the passageway. Also, it is necessary to newly design tools, etc. to meet the increased outer diameter of the cable. It follows that, in order to increase the number of optical fiber tapes arranged within the optical fiber cable, it is necessary to improve the construction of the optical fiber tape itself such that the tapes can be arranged within the optical fiber cable in a higher density.

As a means for improving the construction of the optical fiber tape, it is proposed to decrease the thickness of a resin coating layer having a plurality of optical fibers embedded therein. The conventional optical fiber tape arranged within a slot-type optical fiber cable comprises four optical fibers and a resin layer formed to cover collectively the four optical fibers. These optical fibers, each having a coating layer and a diameter of, for example, 125 µm, are arranged side by side. In general, the resin layer has a thickness, i.e., distance between the outer surface of the resin layer and the outer surface, which faces the outer surface of the resin layer, of the coated optical fiber, of 120 to 150 µm. To be more specific, it is proposed to decrease the resin layer thickness from the conventional level of 120 to 150 µm to 30 to 100 µm as a means for increasing the density of the optical fiber tapes arranged within the optical fiber cable. The optical fiber tape of the particular construction is generally called a thin optical fiber tape.

However, it has been found that, when thin optical fiber tapes are stacked one upon the other within grooves of the base body at a density higher than in the past, a transmission loss derived from micro-bend is increased.

DISCLOSURE OF INVENTION

An object of the present invention, which has been achieved in view of the situation described above, is to provide an optical fiber cable which permits markedly suppressing an increase of transmission loss derived from micro-bend of the optical fiber tapes arranged within a base body and also permits arranging optical fiber tapes within the base body at a higher density.

According to a first embodiment of the present invention, there is provided an optical fiber cable, comprising: a longitudinally extending core body having spiral grooves formed thereon; and at least one optical fiber ribbon housed in any one of said grooves, said ribbon including a plurality of optical fibers embedded in a strip of resin, wherein said core body is made from a mixture of at least two materials having different molecular weight distributions.

It is desirable that the mixture contains at least a low molecular weight polyethylene having a peak of polystyrene standard molecular weight distribution within a range between $3\times10^4$ and $8\times10^4$ and a high molecular weight polyethylene having a peak of polystyrene standard molecular weight distribution within a range between $7\times10^4$ and $1.5\times10^5$, and the polystyrene peak appearing in said high molecular weight polyethylene that invariably remains greater than said polystyrene peak appearing in said low molecular weight polyethylene.

According to a second embodiment of the present invention, there is provided an optical fiber cable, comprising: a longitudinally extending core body having spiral grooves formed thereon; and at least one optical fiber ribbon housed in any one of said grooves, said ribbon including a plurality of optical fibers embedded in a strip of resin, wherein projections formed on the inner surface of any one of said spiral groove measure 30 µm or less in height.

It is desirable that the strip of resin of the fiber ribbon provides a resin thickness of 30 to 100 µm over each embedded fiber in each direction perpendicular to the fiber ribbon.

BEST MODE OF CARRYING OUT THE INVENTION

Figure 1:
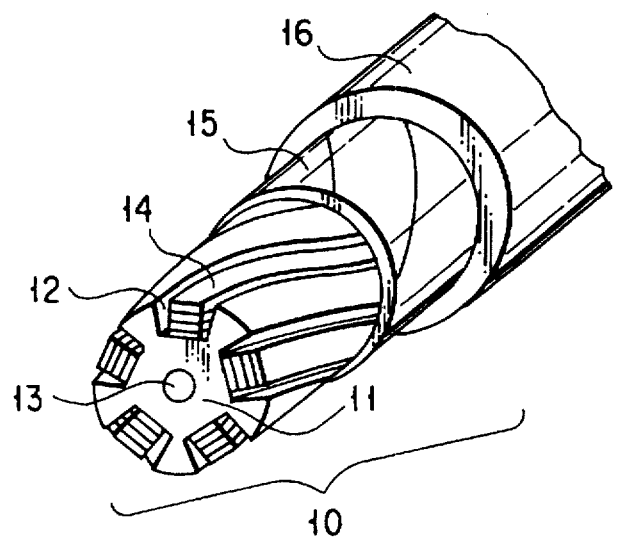
FIG. 1 shows the construction of a slot-type optical fiber cable according to the present invention.

Let us describe the present invention with reference to the accompanying drawings.

Specifically, the present inventors prepared thin optical fiber tapes each including a resin coating film having a thickness of 70 µm in contrast to the conventional thickness of 135 µm. Then, an optical fiber cable was prepared by using the thin optical fiber tapes thus prepared. In this case, 8 optical fiber tapes were stacked one upon the other within each spiral groove of the base body, though only 4 optical fiber tapes were stacked within each spiral groove in the conventional optical fiber cable. The characteristics such as bending and cable temperature of the resultant optical fiber cable were measured so as to find that an increased transmission loss derived from micro-bend took place within the optical fiber embedded within the optical fiber tape.

Under the circumstances, the present inventors have made an extensive research. It has been found that the increase of the transmission loss takes place in only an optical fiber cable prepared by arranging the thin optical fiber tapes in the conventional base body. It has also been found that the increase of the transmission loss taking place in only the particular optical fiber cable noted above is caused by projections formed on the inner surface of the base body made of a high density polyethylene. The present inventors have looked into the inner surface of the spiral groove formed on the circumferential surface of the base body used in the conventional optical fiber cable. It has been found that the projections are formed over the entire region of the inner surface at a rate of 10 projections/mm². It has also been found that these projections have a height of 10 to 100 µm, the heights of most projections falling within a range of between 50 and 70 µm.

In order to decrease the diameter of the optical fiber cable, it may be effective to decrease the diameter of the base body in which optical fiber tapes are arranged. It should be noted in this connection that optical fibers should be arranged in a manner to prevent the optical characteristics thereof from being adversely affected within the base body. In this respect, it is undesirable to decrease the cross sectional area of the spiral groove in which the optical fiber tapes are arranged. Specifically, the decrease of the cross sectional area noted above causes an increase in the side pressure loss of the optical fiber, with the result that the optical characteristics of the optical fiber are adversely affected. Such being the situation, it may also be possible to decrease the diameter of the optical fiber cable by decreasing the diameter of the base body while maintaining constant the cross sectional area of the spiral groove formed on the surface of the base body. In this case, it is important to select appropriately the resin used for forming the base body. Specifically, the resin should have a sufficiently high mechanical strength such that a side pressure should not be given to the optical fiber tape by the deformation of the base body. An important mechanical strength required in this respect is a bending modulus of the resin.

In the first embodiment of the present invention, the base body is formed of a mixture of at least two materials differing from each other in the molecular weight distribution so as to suppress formation of projections, which cause an increased transmission loss of the optical fiber, while maintaining a required mechanical strength of the base body. In the second embodiment of the present invention, the height of the projection is defined to be 30 µm or less so as to prevent substantially completely the projections from causing an increase in the transmission loss of the optical fiber.

As described above, the base body included in the optical fiber cable according to the first embodiment of the present invention is formed of a mixture of at least two materials differing from each other in the molecular weight distribution. To be more specific, the particular mixture includes, for example, a polymer prepared by polymerizing a low molecular weight component and a high molecular weight component, and a mixture of these low and high molecular weight components. What is important is that any material including a single material, not a mixture, can be used for forming the base body as far as the base body material exhibits a plurality of peaks in its molecular weight distribution.

In the first embodiment of the present invention, it is desirable for the base body to be formed of a mixture including at least a first material having a peak of the polystyrene standard molecular weight distribution within a range of between $3 \times 10^4$ and $8 \times 10^4$, and a second material having a peak of the polystyrene standard molecular weight distribution within a range of between $7 \times 10^4$ and $1.5 \times 10^5$. It should be noted that the second material has a peak of the polystyrene standard molecular weight distribution on the side of a higher molecular weight, compared with the first material. Incidentally, it is possible for any of the first and second materials to have a peak which does not fall within the ranges given above.

The term "polystyrene standard molecular weight" denotes a molecular weight of a substance which is determined on the basis of an eluting time of the substance. To be more specific, an eluting time of a substance whose molecular weight is unknown is measured. Also, a calibration curve is prepared by measuring the eluting time of polystyrene whose molecular weight is known by using a gel permeation chromatography (GPC) under the conditions given below. Finally, the eluting time of the substance whose molecular weight is unknown is converted into the polystyrene standard molecular weight by using the calibration curve.

(GPC Measuring Conditions)

Measuring Machine: 150 CV manufactured by Waters Inc.

Solvent: o-dichlorbenzene (containing 0.3% of BHT: BHT 1-hydroxy-4-methyl-2,6-di-tert-butyl benzene)

Column: AT-G+AT-806 M/S×2 manufactured by Shodex Inc.

Temperature: Column and Indicator 145° C.

Concentration: 0.1 wt/vol %

Flow rate: 1.0 ml/min.

Standard Sample: Polystyrene

Detector: Differential refractive index detector (RI)

In view of the properties required for arranging the optical fiber tapes therein, the base body material used in the present invention includes, for example, a high density polyethylene having a density of 0.94 to 0.97 g/cm$^3$, polyolefin resins such as polypropylene having a density of 0.90 to 1.30 g/cm$^3$, polyamide resins and other engineering plastics. It is most desirable to use a high density polyethylene in view of the actual use over a long period of time in the past, workability, cost, etc. Further, in view of the moldability, it is desirable to use a mixture of at least two similar materials differing from each other in the molecular weight distribution.

In the first embodiment of the present invention, the base body of the optical fiber cable is formed of, for example, a mixture containing at least a first material having a peak of the polystyrene standard molecular weight distribution at a relatively high region, and a second material having a peak of the polystyrene standard molecular weight distribution at a relatively low region. The first material noted above contributes to the improvement of, for example, a bending modulus, which is an important mechanical property required in the base body, of the resultant base body. On the other hand, the second material noted above contributes to the improvement of, for example, a melt index, which is decisively important for improving the moldability of the base body material. It follows that it is possible to prevent the occurrence of projections which cause an increased transmission loss of the optical fiber while maintaining a sufficiently high mechanical strength by mixing these first and second materials at a suitable mixing ratio.

It should also be noted that, in the first embodiment of the present invention, it is desirable for the base body material to have a bending modulus of 180 kg/mm$^2$ or less in order to permit the resultant optical fiber cable to be bent without difficulty. On the other hand, the bending modulus of the base body material should desirably be 80 kg/mm$^2$ or more in view of the side pressure applied to the optical fiber tape embedded in the spiral groove of the base body.

In the second embodiment of the present invention, the height of the projections formed on the inner surface of the spiral groove of the base body is defined to be 30 μm or less. As a result, the optical fiber tape embedded in the spiral groove of the base body is not affected by the projections regardless of the thickness of the optical fiber tape embedded in the spiral groove. To be more specific, the optical fiber tapes arranged within the spiral groove may possibly be pressed partially. However, where the height of the projections is 30 μm or less, the resultant side pressure applied to the optical fiber tape is not so high as to cause micro-bend occurrence, with the result that the transmission loss does not take place.

The present inventors have also found that the projections do not cause all the thin optical fiber tapes to bear an increased transmission loss. Specifically, it has been found that the relationship between the height of the projections and the thickness of the optical fiber tape is deeply related to the increase in the transmission loss of the optical fiber cable. In other words, it has been found that an increase in the transmission loss can be prevented substantially completely, if the particular relationship meets certain conditions. For example, when it comes to the thin optical fiber tape covered with a resin coating layer having a thickness of 30 μm in contrast to at least 120 μm for the conventional optical fiber tape, the optical fiber tape is partially pressed in the case where the height of the projections formed on the inner surface of the spiral groove exceeds 30 μm, i.e., height of, e.g., 40 μm. In this case, the side pressure applied to the optical fiber tape causes the optical fibers arranged within the tape to bear micro-bend, leading to an increase of the transmission loss.

Under the circumstances, the thickness of the resin coating layer covering the optical fiber tape is defined to fall within a range of between 30 μm and 100 μm in the second embodiment of the present invention. In other words, a thin optical fiber tape is used in the second embodiment. What should be noted is that, even if thin optical fiber tapes defined in the second embodiment are arranged within the spiral groove of the base body in a high density, it is possible to suppress an increase of the transmission loss derived from the presence of micro-bend caused by the side pressure applied from the projections from the inner surface of the spiral groove formed on the base body.

It should be noted that the projections defined in the second embodiment of the present invention differ from the convex-concave portions appearing on the surface of a molded body. In other words, the presence of projections from the inner surface of the spiral groove of the base body is irrelevant to the definition of the surface roughness on the inner surface of the spiral groove.

FIG. 1 shows a slot-type optical fiber cable 10 according to one embodiment of the present invention. As seen from the drawing, the cable 10 comprises a long tension member 13 and a base body 11 covering the outer circumferential surface of the tension member 13. A plurality of spiral grooves 12 are formed along the outer surface of the base body 12. Also, a plurality of thin optical fiber tapes 14 are arranged one upon the other within each spiral groove 12. Further, a holding tape 15 is wound about the base body 11 in a manner to cover the thin optical fiber tapes 14 arranged within the spiral grooves 12. Still further, the resultant structure is covered with a sheath 16 so as to provide the optical fiber cable 10.

The tension member 13 is formed of, for example, a stranded steel wire, a single steel wire, or an FRP (fiber-reinforced plastic) rod containing aramid fibers or glass fibers. In the embodiment shown in FIG. 1, a single steel wire having an outer diameter of 1.2 mm is used as the tension member 13.

The size of the spiral groove 12 and the number of grooves 12 formed along the outer surface of the base body 11 can be determined appropriately. In the embodiment shown in the drawing, the groove 12 has a width of 1.5 mm and a depth of 4 mm. Also, five grooves are formed along the outer surface of the base body 11. In the embodiment shown in FIG. 1, the grooves 12 are formed spiral such that these grooves are slowly turned continuously in a single direction along the length of the optical fiber cable 10. Alternatively, the grooves 12 may be formed to extend straight in the longitudinal direction of the cable 10. Further, the groove 12 may be of a so-called inverted spiral (SZ) type in which the extending direction of the groove 12 is curved by a predetermined angle in a first direction and, then, in a second direction opposite to the first direction. In this case, the curving directions are inverted periodically to provide the SZ type grooves along the outer surface of the base body 11. These grooves 12 can be formed along the outer surface of the base body 11 by, for example, an extrusion molding method in which the head of the molding die is rotated.

The holding tape 15 can be formed of a tape of polyethylene, polyester, polypropylene, etc. The number of turns of the holding tape 15 can be determined appropriately. In the embodiment shown in FIG. 1, a single holding tape is wound about the base body 11 at a ½ lap.

The sheath 16, which is formed of a low density polyethylene, a linear low density polyethylene, etc., can be formed by, for example, an extrusion coating method. It is desirable for the thickness of the sheath 16 to fall within a range of between 1.5 mm and 3.0 mm in view of the required mechanical characteristics of the cable 10 and the manufacturing cost. In the embodiment shown in FIG. 1, the sheath 16 is formed by means of an extrusion coating which is performed such that a polyethylene resin is extruded to cover the holding tape 15 in a thickness of 2 mm.

Figure 2:
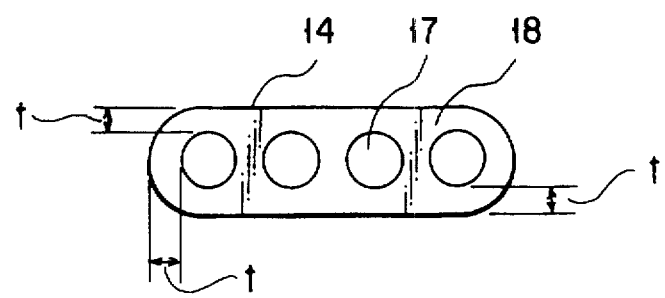
FIG. 2 shows in a magnified fashion an example of a thin optical fiber tape arranged within the optical fiber cable of the present invention.
Figure 3:
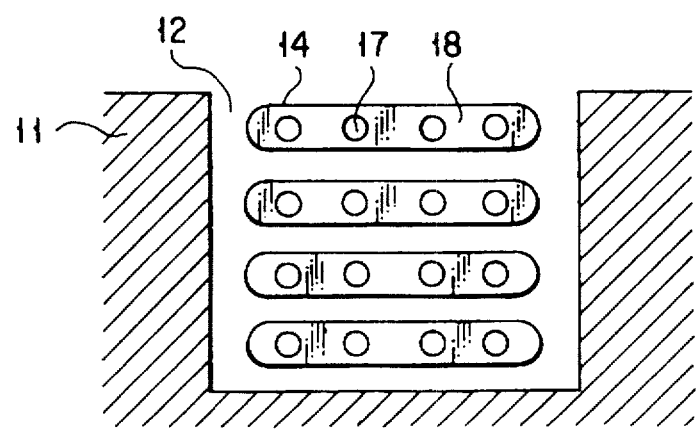
FIG. 3 shows in a magnified fashion how thin optical fiber tapes are laminated within a groove formed on the outer circumferential surface of a base body in an optical fiber cable according to a first embodiment of the present invention.

The thin optical fiber tapes 14 are stacked one upon the other within the spiral groove 12 of the base body 11. In this embodiment, four tapes 14 are arranged within the groove 12, as shown in FIG. 3. As shown in FIG. 2, four optical fibers 17 each having a coating layer are arranged side by side to form a single row, and a resin coating layer 18 is formed by using, for example, an ultraviolet-curing resin to cover the row of these optical fibers 17 so as to form the thin optical fiber tape 14. The optical fiber 17 has an outer diameter of, for example, 125 μm. Incidentally, a letter "t" (three occurrences) in FIG. 2 denotes the thickness of the resin coating layer 18 defined in the present invention.

To reiterate, the base body 11 is formed of a mixture of at least two materials differing from each other in the molecular weight distribution. In this case, the inner surface of the spiral groove 12 of the base body 11 is made substantially flat and smooth, as shown in FIG. 3. In other words, the inner surface of the groove is free from projections causing an increase in the transmission loss of the optical fiber. In addition, the base body 11 exhibits a sufficiently high mechanical strength.

Figure 4:
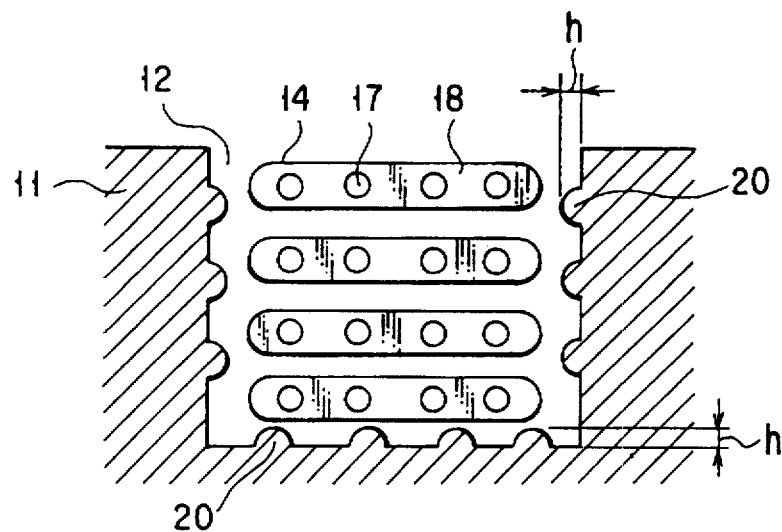
FIG. 4 shows in a magnified fashion how thin optical fiber tapes are laminated within a groove formed on the outer circumferential surface of a base body in an optical fiber cable according to a second embodiment of the present invention.

In the second embodiment of the present invention, as shown in FIG. 4, the height "h" of the projections 20 from the inner surface of the groove 12 is suppressed to a value of 30 μm or less. The height h of the projections 20 is suppressed in the present invention as follows:

1. The base body is formed of a mixture of high density polyethylene resins containing a smaller amount of the high molecular weight component. It should be noted that the projections are formed by an unsatisfactory dispersion of the high molecular weight component in the step of mixing the high and low molecular weight components to prepare the base body material.

2. A layer free from such projections is formed to cover the surface of the base body. To be more specific, the inner surface is coated with a resin which does not give rise to projections. Alternatively, a tape made of such a resin is attached to the inner surface of the base body.

3. In forming the base body by an extrusion molding, the screen mesh of the breaker plate mounted between the extruder cylinder and the extruder head portion is changed so as to control the height h of the projections in question.

Since the height h of the projections 20 is suppressed as pointed out above, these projections 20 are prevented from exerting side pressure to the optical fiber tape 14, making it possible to suppress an increased transmission loss derived from the micro-bend caused by the side pressure.

The prominent effect of the present invention will be clarified sufficiently by the Examples of the present invention which follow:

EXAMPLE 1

This example was directed to the first embodiment of the present invention.

Specifically, an optical fiber cable of the present invention was prepared. The base body 11 of the cable was formed of a high density polyethylene having a density of 0.953 g/cm$^3$, and a bending modulus of 100 kg/mm$^2$. The polyethylene consisted of a first component having a peak of the polystyrene standard molecular weight distribution in a low molecular weight region of about $5 \times 10^4$ and a second component having a peak of the polystyrene standard molecular weight distribution in a high molecular weight region of about $1.3 \times 10^5$. The optical fiber cable prepared in this Example included the base body constructed as shown in FIG. 3. It should be noted that the second component of the high density polyethylene having a peak in the high molecular weight region contributes greatly to an improvement of the mechanical strength of the base body. On the other hand, the first component having a peak in the low molecular weight region contributes to an improvement in moldability of the raw material polyethylene consisting of the first and second components.

The properties of the resultant optical fiber cable were measured as follows. In any of the measurements given below, optical fiber cables whose transmission loss was increased by 0.1 dB or less were evaluated as being satisfactory. On the other hand, optical fiber cables whose transmission loss was increased by more than 0.1 dB were evaluated as being defective.

(Measuring Methods)

(1) Bending of Cables

An optical fiber cable, which was 10 m long, was bent by 180° at a curvature radius of 300 mm so as to measure an increase of the transmission loss at a wavelength of 1.3 μm band.

(2) Side Pressure Characteristics

An optical fiber cable, which was 5 m long, was sandwiched between a pair of flat plates each having a length of 50 mm. Under this condition, a load of 500 kg was applied to the cable through the flat plates so as to measure an increase of the transmission loss at a wavelength of 1.3 μm band.

(3) Temperature Characteristics

An optical fiber cable, which was 750 m long, was wound about a cable-winding drum having an outer diameter of 1500 mm. The cable wound about the drum was left to stand under an atmosphere of 60° C. so as to measure an increase of the transmission loss 24 hours later at a wavelength of 1.3 μm.

The optical fiber cable was found to be satisfactory in any of the bending characteristics, side pressure characteristics and temperature characteristics.

EXAMPLE 2

This example was directed to the second embodiment of the present invention.

In this example, the base body 11 of the optical fiber cable was formed of a high density polyethylene having a density of 0.95 g/cm$^3$ and a bending modulus of 90 kg/mm$^2$. Also, prepared were thin optical fiber tapes 14 each having a thickness "t", as measured from the outer surface of the optical fiber 17 to the outer surface of the resin coating layer 18 of the optical fiber tape 14 as shown in FIG. 2, of 30 μm, 40 μm, 70 μm and 100 μm. Then, prepared were two kinds of base bodies 11 each having the height "h" of the projections 20 from the inner surface of the groove 12 controlled to fall within a range of between 0 and 10 μm or between 20 μm and 30 μm. The height of the projections 20 was controlled by method 3 described previously. Specifically, four screen meshes of 400 meshes were used for controlling the height "h" to fall within a range of between 0 and 10 μm, with three screen meshes of 300 meshes being used for controlling the height "h" to fall within a range of between 20 and 30 μm.

Finally, eight kinds of optical fiber cables 10 were prepared by arranging four kinds of thin optical fiber tapes 14 within each base body. These optical fiber cables were evaluated as in Example 1, with the results as shown in Table 1 below:

TABLE 1

| Height of projections | 0 to 10 (μm) | | | | 20 to 30 (μm) | | | |
|---|---|---|---|---|---|---|---|---|
| Optical fiber tape thickness (μm) | 30 | 40 | 70 | 100 | 30 | 40 | 70 | 100 |
| Evaluation | | | | | | | | |
| Bending | o | o | o | o | o | o | o | o |
| Side Pressure | o | o | o | o | o | o | o | o |
| Temperature | o | o | o | o | o | o | o | o |

Then, the base bodies were formed of the same material, in which the height "h" of the projections from the inner surface of the groove 12 were controlled to fall within a range of 40 to 50 μm and within a range of 60 to 70 μm. Finally, eight kinds of optical fiber cables were prepared by embedding the thin optical fiber tapes prepared in advance in each of the base bodies thus prepared. These 8 kinds of optical fiber cables were evaluated as in Example 1, the results being shown in Table 2 below:

TABLE 2

| Height of projections | 40 to 50 (μm) | | | | 60 to 70 (μm) | | | |
|---|---|---|---|---|---|---|---|---|
| Optical fiber tape thickness (μm) | 30 | 40 | 70 | 100 | 30 | 40 | 70 | 100 |
| Evaluation | | | | | | | | |
| Bending | x | x | o | o | x | x | x | o |
| Side Pressure | x | o | o | o | x | x | o | o |
| Temperature | x | x | x | x | x | x | x | x |

Further, eight kinds of optical fiber cables were prepared by embedding optical fiber tapes each having a thickness "t" defined previously of 120 μm or 150 μm in base bodies each having the height "h" of the projections from the inner surface controlled to fall within a range of 0 to 10 μm, 20 to 30 μm, 40 to 50 μm or 60 to 70 μm. These optical fiber cables were evaluated as in Example 1, with the results as shown in Table 3 below:

TABLE 3

| Optical fiber thickness (μm) | 120 (μm) | | | | 150 (μm) | | | |
|---|---|---|---|---|---|---|---|---|
| Height of projections (μm) | 0 to 10 | 20 to 30 | 40 to 50 | 60 to 70 | 0 to 20 | 30 to 40 | 40 to 50 | 60 to 70 |
| Evaluation | | | | | | | | |
| Bending | o | o | o | o | o | o | o | o |
| Side Pressure | o | o | o | o | o | o | o | o |
| Temperature | o | o | o | o | o | o | o | o |

Figure 5:
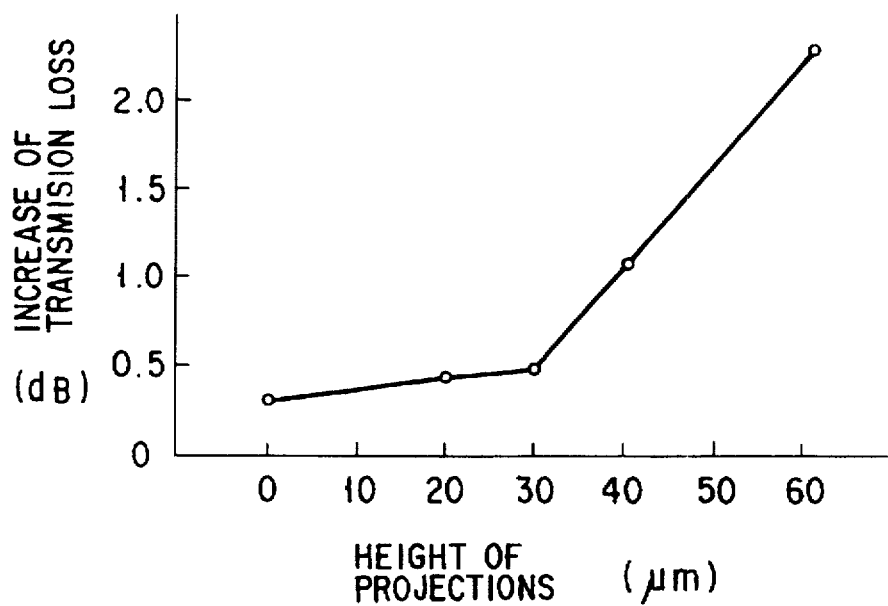
FIG. 5 is a graph showing the relationship between the height of projections and the transmission loss in an optical fiber cable according to the second embodiment of the present invention.

As apparent from Tables 1 to 3, the optical fiber cable comprising a base body having the height "h" of the projections from the inner surface of the groove controlled to be 30 μm or less has been found to be satisfactory in any of the bending characteristics, side pressure characteristics and temperature characteristics regardless of the thickness "t" of the optical fiber tape. In other words, it has been demonstrated that, if the height "h" of the projections is 30 μm or less, the side pressure, even if given by the projection to the optical fiber tape, is not so high as to bring about micro-bend in the optical fibers within the optical fiber tape, making it possible to suppress an increase of the transmission loss. FIG. 5 is a graph showing the relationship between the height of the projections and an increase of the transmission loss. As apparent from the graph, an increase of the transmission loss can be suppressed substantially completely, if the height of the projections is 30 μm or less.

It should be noted in particular that, where the height of the projections from the inner surface of the groove is 30 μm or less, the produced optical fiber cable was found to be satisfactory in any of the bending characteristics, side pressure characteristics and temperature characteristics, even if the thickness "t" of the resin coating layer of the optical fiber tape is 100 μm or less. In other words, it has been found that the optical fiber cable of the present invention produces prominent effects in the case where the thickness "t" of the resin coating layer of the optical fiber tape is 100 μm or less.

Attention should also be paid to Table 3. Specifically, it has been found that, where the thickness "t" of the resin coating layer of the optical fiber tape is 120 to 150 μm as in the prior art, the produced optical fiber cable is satisfactory in the bending characteristics, etc. as far as the height of the projections from the inner surface of the groove is 40 to 70 μm as in the prior art. Incidentally, optical fiber cables were prepared by embedding conventional optical fiber tapes in base bodies each having the height of the projections in question controlled to be 30 μm or less as defined in the present invention. These optical fiber cables have been found to be satisfactory in any of the bending characteristics, side pressure characteristics and temperature characteristics, as expected.

To reiterate, the optical fiber cable of the present invention comprises a base body formed of a mixture of at least two materials differing from each other in molecular weight distribution, i.e., materials having peaks in different positions in the polystyrene standard molecular weight distribution. As a result, it is possible to prevent occurrence of projections causing an increase of transmission loss while maintaining a sufficiently high mechanical strength.

What should also be noted is that, in the present invention, the height of the projections from the inner surface of a spiral groove formed in the base body of the cable is defined to be 30 μm or less. As a result, the optical fiber tapes arranged within the groove are not affected by these projections. To be more specific, since the height of the projections is 30 μm or less, the side pressure, even if given by the projection to the optical fiber tape, is not so high as to bring about micro-bend in the optical fibers within the optical fiber tape, making it possible to suppress an increase of the transmission loss.

As described above in detail, the present invention produces a prominent effect that, even if longer optical fiber tapes are arranged within the spiral groove formed on the outer circumferential surface of the base body, it is possible to suppress an increase of the transmission loss. What should also be noted is that, even if the thickness of the resin coating layer of the optical fiber tape is made smaller than in the past, it is possible to suppress an increase of the transmission loss, making it possible to use thin optical fiber tapes in manufacturing optical fiber cables. It follows that it is possible to increase the number of optical fiber tapes arranged within a single spiral groove of the base body, compared with the conventional optical fiber cable. Alternatively, where the same number of optical fiber tapes are arranged within a single spiral groove, the present invention permits decreasing the outer diameter of the optical fiber cable.

We claim:

1. An optical fiber cable, comprising:
   a longitudinally extending core body having a plurality of spiral grooves formed thereon; and
   at least one optical fiber ribbon housed in any one of said grooves, said at least one optical fiber ribbon including a plurality of optical fibers embedded in a strip of resin,
   wherein projections formed on an inner surface of any one of said spiral grooves measure 30 μm or less in height.

2. The optical fiber cable according to claim 1, wherein said strip of resin of said at least one optical fiber ribbon has a resin thickness of 30 to 100 μm over each embedded optical fiber in each direction perpendicular to the optical fiber ribbon.

3. The optical fiber cable according to claim 1, wherein said spiral grooves are formed on the outer circumference of said core body.

4. The optical fiber cable according to claim 3, wherein said spiral grooves extend longitudinally of said core body.

5. The optical fiber cable according to claim 1, wherein said spiral grooves extend longitudinally of said core body.

6. The optical fiber cable according to claim 1, wherein said projections are formed on at least one side surface of said any one of said spiral grooves.

7. The optical fiber cable according to claim 1, wherein said projections are formed on a bottom surface of said any one of said spiral grooves.

8. The optical fiber cable according to claim 1, wherein each of said plurality of spiral grooves has at least one of said optical fiber ribbons housed therein.

9. The optical fiber cable according to claim 8, wherein at least one of said spiral grooves has a plurality of stacked optical fiber ribbons housed therein.

10. The optical fiber cable according to claim 1, wherein at least one of said spiral grooves has a plurality of stacked optical fiber ribbons housed therein.

* * * * *